W. WURDEMANN.
MEASURING DISTANCES.
No. 6,709. Patented Sept. 11, 1849.
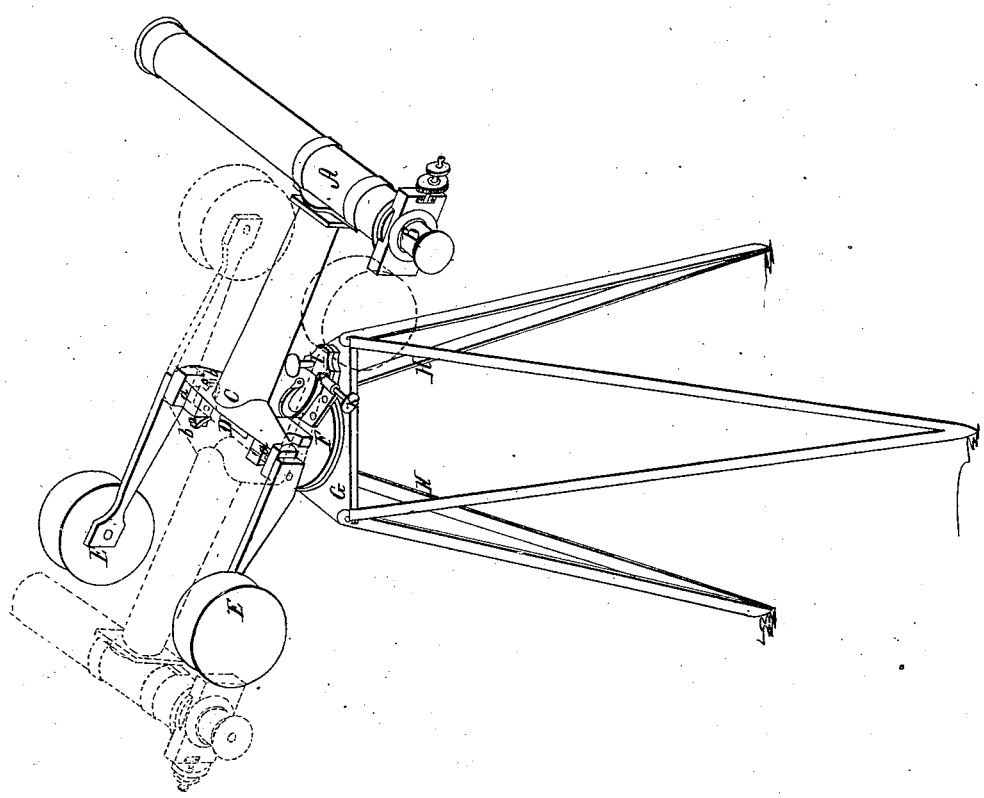
Witnesses:
Inventor:

UNITED STATES PATENT OFFICE.

WM. WÜRDEMANN, OF WASHINGTON, DISTRICT OF COLUMBIA.

PARALLACTIC INSTRUMENT FOR MEASURING DISTANCES.

Specification of Letters Patent No. 6,709, dated September 11, 1849.

*To all whom it may concern:*

Be it known that I, WILLIAM WÜRDEMANN, of Washington, District of Columbia, have invented a new and useful Instrument for Measuring Distances, and do declare that the following is a full and exact description of the construction and use of the same, reference being had to the annexed drawing, making a part of this specification, wherein a view of the instrument is shown.

The principle of my invention consists in thus mounting a telescope, provided with a micrometer eyepiece, that two positions, as nearly as possible parallel to each other may be given to it. The distance of the two positions from each other, which is invariable, furnishes the base, which being transferred, by means of the micrometer crosswire, to the object, whose distance is to be measured, appears in the field of the telescope of a magnitude, in an exact inverse proportion in relation to the distance. This magnitude being measured by means of the micrometer, the angle of parallax is thereby obtained, from which the distance may be calculated, or, more conveniently, read off from a table previously prepared for the instrument.

To enable others skilled in the art to make and use my invention, I will proceed to describe its construction and operation.

I take a telescope (A) in any of the known forms, wherein a crosswire for sighting can be used; this is furnished with a sliding filar micrometer eyepiece (B), such as is commonly used on astronomical instruments, having a simple crosswire on the micrometer slide, in the common foci of the object glass and eyepiece. The telescope is fixed firmly to a frame or arm (C), that reaches horizontally from the center of the stand (D), with counterpoises (E E) on the opposite end. Here it is held by two conical steel points (*a a*) serving as pivots, on which the telescope with its frame can be moved, without changing its direction, that is, the two points named must lie parallel to the axis of the telescope, to insure the parallism of its direction on the other side. The stand (G) must needs have a coarse and fine movement, horizontally as well as vertically, for setting the telescope in exact position. The legs of the stand (H H), for security against wavering, must be of the most unyielding kind, for which reason I have adopted the split form, as shown in the drawing.

The mode of operation with the instrument is as follows: The telescope being laid to the left hand side, and the micrometer wire being screwed to zero, inside and outside, the instrument is placed so that the telescope object glass is over the point, from which the measurement is to be taken. It is then turned toward the object, whose distance shall be ascertained (with the clamp screw (I) loosened); when the object appears near the center of the field, the clamp is screwed fast, and the final setting of the crosswire on some linear portion of the object is accomplished by means of the tangent screw (K). The telescope is then carefully laid over to the right hand side, which can be done by gently pressing it with one finger in the direction of the required movement, until it meets the stop screw ($b\ b''$) on the other side. The object before pointed at, if not too near for the capacity of the field, will still appear in the telescope, but, in an inversed proportion to the distance, more or less removed from the crosswire. This is then made to coincide with the object as before, but this time with the micrometer screw of the eyepiece. The micrometer is then read off, the whole turns, counting 100, on the teeth of the comb in the telescope field, and the single divisions on the divided head of the screw. The number thus obtained gives on the table the distance in feet.

For ascertaining the adjustment of the instrument, it is only required to mark on a board, or strip of paper, the base, or distance of the two positions of the telescope and place the same horizontally a few hundred feet off. If then the telescope crosswire in its two positions coincides with the lines on the target, the adjustment is complete; if not, recourse must be had to the adjusting screw.

What I claim as my invention and desire to secure by Letters Patent, is—

Mounting a telescope furnished with a micrometer upon an axis parallel to its line of collimation, as herein described, whereby the telescope can be made with facility and accuracy to take two parallel positions at the extremities of a given baseline, for the purpose of measuring the distance of a remote object, by means of the parallactic angle thus obtained, measured by the micrometer.

WM. WÜRDEMANN.

Witnesses:
HENRY BENNER,
ALBERT PROLLE.